United States Patent
Kiss et al.

(10) Patent No.: US 8,864,980 B2
(45) Date of Patent: Oct. 21, 2014

(54) HYDROTREATING PROCESS

(75) Inventors: Gabor Kiss, Hampton, NJ (US); Iulian Nistor, Center Valley, PA (US); John Zengel, Clinton, NJ (US); Sabato Miseo, Pittstown, NJ (US); Roman Krycak, Annandale, NJ (US); Teh C. Ho, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 182 days.

(21) Appl. No.: 13/575,849

(22) PCT Filed: Feb. 21, 2011

(86) PCT No.: PCT/US2011/025597
§ 371 (c)(1),
(2), (4) Date: Jul. 27, 2012

(87) PCT Pub. No.: WO2011/106277
PCT Pub. Date: Sep. 1, 2011

(65) Prior Publication Data
US 2013/0006029 A1    Jan. 3, 2013

Related U.S. Application Data

(63) Continuation of application No. 12/660,249, filed on Feb. 23, 2010, now Pat. No. 8,747,659.

(51) Int. Cl.
| | |
|---|---|
| C10G 45/08 | (2006.01) |
| C10G 45/04 | (2006.01) |
| C10G 45/06 | (2006.01) |
| B01J 23/24 | (2006.01) |
| B01J 23/26 | (2006.01) |
| B01J 23/28 | (2006.01) |
| B01J 27/24 | (2006.01) |
| C10G 45/02 | (2006.01) |
| C10G 49/24 | (2006.01) |
| B01J 38/56 | (2006.01) |

(52) U.S. Cl.
CPC ........ *C10G 49/24* (2013.01); *C10G 2300/4006* (2013.01); *C10G 45/08* (2013.01); *B01J 38/56* (2013.01); *C10G 2300/4018* (2013.01); *C10G 2300/4012* (2013.01); *C10G 45/02* (2013.01); *C10G 2300/1055* (2013.01); *C10G 2300/1096* (2013.01); *C10G 2400/04* (2013.01); *C10G 2300/202* (2013.01)
USPC ........... 208/217; 208/209; 208/213; 208/215; 502/200; 502/300; 502/305; 502/313

(58) Field of Classification Search
CPC ............ B01J 21/12; B01J 27/00; B01J 27/24; B01J 38/56; C10G 2300/1055; C10G 2300/1096; C10G 2300/202; C10G 2300/4006; C10G 2300/4012; C10G 2300/4018; C10G 2400/04; C10G 45/02; C10G 45/08
USPC .......... 208/209, 213, 215, 217; 502/200, 300, 502/305, 313
See application file for complete search history.

(56) References Cited

U.S. PATENT DOCUMENTS

| | | | |
|---|---|---|---|
| 3,436,338 A | 4/1969 | Pratt et al. | |
| 4,973,397 A | * 11/1990 | Ho | ................................ 208/112 |
| 5,306,681 A | 4/1994 | Schorfheide et al. | |

OTHER PUBLICATIONS

Song, Tao; Zhang, Zisheng; Chen, Jinwen; Ring, Zbigniew; Yang, Hong; Zheng, Ying, "Effect of Aromatics on Deep Hydrodesulfurization of Dibenzothiophene and 4,6-Dimethyldibenzothiophene over NiMo/Al2O3 Catalyst", Energy & Fuels, Nov./Dec. 2006, 20(6), pp. 2344-2349.

(Continued)

*Primary Examiner* — Walter D Griffin
*Assistant Examiner* — Derek Mueller
(74) *Attorney, Agent, or Firm* — Chad A. Guice

(57) ABSTRACT

A process for hydrotreating a first aromatics- and sulfur-containing hydrocarbon feed using a fresh supported CoMo catalyst, includes treating the fresh catalyst under first hydrotreating conditions with a second hydrocarbon feed having a lower aromatics content than the first feed.

16 Claims, 1 Drawing Sheet

(56) References Cited

OTHER PUBLICATIONS

Zainullin, KH N; Tanatarov, MA, "Deactivation of an Alumina-Cobalt-Molybdenum Catalyst by Condensation Products", Neftekhimiya vol. 20 n. 3, pp. 382-387 (May-Jun. 1980).

Galiasso R.; Badras, C.; Garcia, W.; Ramirez De Agudelo, R.; Rodriguez, E., "Hydrotreatment of Cracked Gas Oils (CGO) Hydrotraitement De Gasoles Craques", Rev. Inst. Fr. Pet. vol. 42 N.5, pp. 567-585 (Sep.-Oct. 1987), ISSN: 0020-2274.

Turaga, Uday T.; Song, Chunshan, "MCM-41 Supported Co-Mo Catalysts for Deep Hydrodesulfurization of Light Cycle Oil-Based Real Feedstock", Fuel Chemistry Division Preprints 2002, 47(2), pp. 457-459.

Leliveld, R.G.; Van Dillen, A.J.; Geus, J.W.; Konongsberger, D.C., "Structure and Nature of the Active Sites on CoMo Hydrotreating Catalysts Conversion of Thiophene", Journal of Catalysis 175, pp. 108-116 (1998).

Rana, Mohan S.; Ramirez, Jorge; Gutierrez-Alejandre, Aida; Ancheyta, Jorge; Cedeno, Luis; Maity, S.K., "Support effects in CoMo hydrodesulfurization catalysts prepared with EDTA as a chelating agent", Journal of Catalysis 246 (2007), pp. 100-108.

Topsoe, Henrik; Clausen Bjerne S.; "Active Sites and Support Effects in Hydrodesulfurization Catalysts", Applied Catalysis, 25 (1986), pp. 273-293.

\* cited by examiner

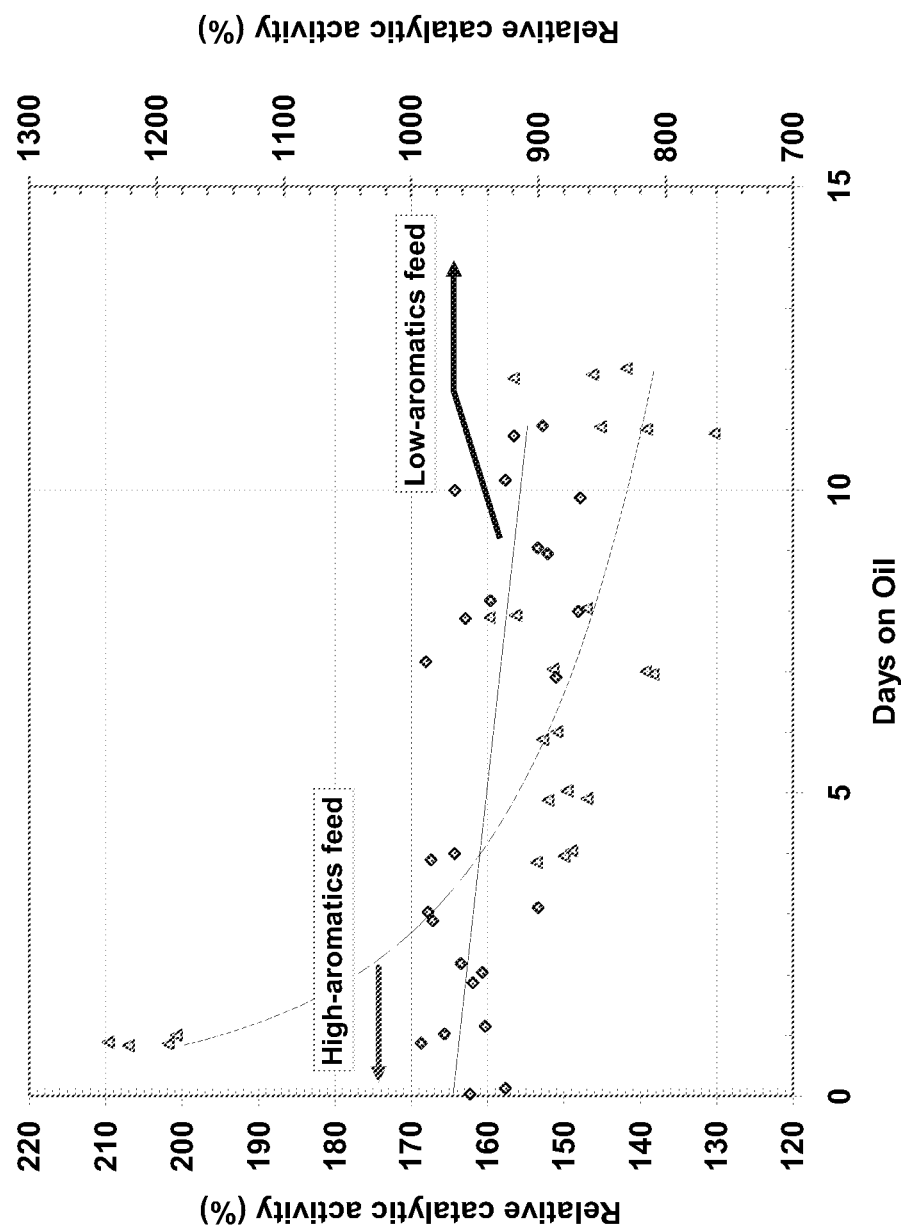

HYDROTREATING PROCESS

The present application is a 35 U.S.C. 371 national stage application of PCT/US2011/025597 filed Feb. 21, 2011, which claims priority to U.S. non-provisional application Ser. No. 12/660,249 filed Feb. 23, 2010.

FIELD OF THE INVENTION

This invention relates to hydrotreating processes for reducing the level of sulfur in diesel fuels and other sulfur-containing hydrocarbon feeds.

BACKGROUND OF THE INVENTION

Supported CoMo catalysts have been used for decades in the fixed bed hydrotreatment of diesel fuels. These catalysts have been proven to be very effective for removing the bulk of the sulfur content from diesel fuels at relatively low cost. Moreover, until the 2006 U.S. regulatory changes reduced the maximum sulfur levels in diesel fuels from 500 ppm by weight (S500) to 15 ppm by weight (S15), these catalysts were also typically very robust, generally lasting for years before replacements were necessary, and thereby typically affording very low catalyst cost.

However, delivering S15 generally requires an increase of the severity of the hydrotreating conditions when using the same catalyst, which in turn leads to faster catalyst deactivation, particularly in relatively low-pressure units that have to rely more on increased temperature to produce S15. The catalyst deactivation often accelerates so much that it significantly affects the cost of refining diesel fuel. There is, therefore, a need for process and/or catalyst solutions to mitigate the accelerated catalyst deactivation involved in hydrotreating diesel fuels to sulfur levels below 15 wppm.

According to the present invention, it has now been found that the impact of catalyst deactivation, particularly during the start up, can be reduced by using a start-up feed with reduced aromatic content as compared with that of the feed to be hydrotreated.

U.S. Pat. No. 3,436,338 discloses that hydrocracking catalysts which have been partially deactivated by polycyclic aromatic hydrocarbons present in the charge stock are reactivated by introducing a feed having a lower polycyclic aromatic content. This patent is, however, silent as to the effect of lowering the overall aromatic content of the deactivation rate of a fresh, undeactivated catalyst.

SUMMARY OF THE INVENTION

One aspect of the invention relates to a process for hydrotreating, or alternately starting up a hydrotreating process involving, a first aromatics- and sulfur-containing hydrocarbon feed, preferably a diesel fuel (for example having an aromatic content of at least 20 wt %), using a fresh supported CoMo catalyst, the process including, or consisting essentially of, treating the fresh catalyst under first hydrotreating conditions with a second hydrocarbon feed having a lower aromatics content than the first feed, and then, optionally but preferably, also hydrotreating the first feed. Advantageously, the first hydrotreating conditions can include a temperature of about 300° C. to about 350° C., a pressure of about 1.5 MPag to about 3.5 MPag, and an LHSV of about 0.3 hr$^{-1}$ to about 1.0 hr$^{-1}$. In one embodiment, the treating is conducted from 3 days to 10 days.

In one embodiment, the process further comprises contacting the treated catalyst with the first aromatics- and sulfur-containing hydrocarbon feed under second hydrotreating conditions to reduce the sulfur content of the first feed to 15 wppm or less. Conveniently, the second hydrotreating conditions include a temperature of about 300° C. to about 380° C., a pressure of about 1.5 MPag to about 3.5 MPag, and an LHSV of about 0.2 hr$^{-1}$ to about 0.8 hr$^{-1}$.

In one embodiment, the first and second hydrotreating conditions can be substantially the same.

Conveniently, the second feed can be produced by adding aliphatic hydrocarbons to the first feed. In one such embodiment, the process can further comprise adding the aliphatic hydrocarbons to the first feed so as to reduce the aromatics content thereof by at least 50%.

Another aspect of the invention relates to a method for selectively treating hindered sulfur species from a sulfur-containing hydrocarbon feed, the method comprising: providing a multimetallic amine oxide catalyst having the formula $(T1)_x(T2)_{(1-x)}(am)_a(M6)O_b$, where T1 is a first row transition metal from Group VIII of the Periodic Table of Elements, where T2 is a first row transition metal from Group VIIB and/or Group VIII of the Periodic Table of Elements that is different from T1, where M6 is molybdenum and/or tungsten, where "am" is an organic amine ligand such as ethylenediamine, where "x" is a relative molar amount of T1 such that 0<x≤1, where "a" is a relative molar amount of the organic amine ligand such that 1≤a≤6, and where "b" is a relative molar amount of the oxygen and 3≤b≤5; sulfiding the multimetallic amine oxide catalyst using a sulfiding composition and sulfiding conditions in the liquid phase in order to activate the catalyst for selective hydrodesulfurization; contacting the activated catalyst with a hydrocarbon feed having at least 25 wppm of hindered sulfur species and/or having a ratio of hindered sulfur species to unhindered sulfur species of at least 0.4:1, in the presence of hydrogen, under conditions sufficient to selectively hydrodesulfurize the hindered sulfur species in the feed, so as to attain a treated hydrocarbon feed having no more than 10 wppm of hindered sulfur species and having 30 wppm or less total sulfur content.

In some embodiments, the hydrocarbon feed (optionally having a total sulfur content of at least 2000 wppm), prior to being contacted with the activated catalyst, can first be placed in the presence of a hydrotreating catalyst and hydrogen, under similar or different effective hydrotreating conditions (which can optionally but advantageously reduce the total sulfur content to 500 wppm or less) to cause said resultant pre-treated feed to have at least 25 wppm of hindered sulfur species and/or to have a ratio of hindered sulfur species to unhindered sulfur species of at least 0.4:1 upon being contacted with the activated catalyst.

Additionally or alternately, the multimetallic amine oxide catalyst can be a cobalt-amine molybdate catalyst having the formula $Co_x(T2)_{(1-x)}(am)_a MoO_b$, where T2 is a first row transition metal from Group VIIB and/or Group VIII of the Periodic Table of Elements other than cobalt, where "am" is an organic amine ligand, where "x" is a relative molar amount of cobalt such that 0.33≤x≤1, where "a" is a relative molar amount of the organic amine ligand such that 1≤a≤6, and where "b" is a relative molar amount of the oxygen and 3≤b≤5. In some preferred embodiments, the cobalt-amine molybdate catalyst has the formula $Co(en)_3MoO_4$.

BRIEF DESCRIPTION OF THE DRAWING

FIG. 1 shows a comparison of the start-of-run (SOR) deactivation of the supported CoMo hydrotreating catalyst of Example 1 with two different feeds, one highly aromatic and one nearly free of aromatics, at otherwise identical conditions.

DETAILED DESCRIPTION

One aspect of the invention involves a process for hydrotreating a first aromatics- and sulfur-containing hydrocarbon feed using a fresh supported CoMo catalyst, wherein the average rate of deactivation of the catalyst is reduced by treating the fresh catalyst under first hydrotreating conditions with a second hydrocarbon feed having a lower aromatics content than the first feed.

As used herein the term "fresh catalyst" is used to describe a catalyst which has not previously been used in a catalytic process or which has not previously contacted the first feed since a prior regeneration or reactivation. Fresh catalyst may, however, have undergone prior activity adjustment, for example, by sulfiding.

In addition, the term "supported catalyst" is used to describe a catalyst in which the active components, in this case cobalt and molybdenum metals or compounds thereof, are deposited on a carrier or support.

In particular, the present catalyst comprises cobalt, which can typically be present in an oxide form in an amount ranging from about 2 wt % to about 20 wt %, preferably from about 4 wt % to about 12 wt %, based on the total catalyst weight. Similarly, the catalyst also comprises molybdenum, which can typically be present also in an oxide form in an amount ranging from about 5 wt % to about 50 wt %, preferably from about 10 wt % to about 40 wt %, for example from about 20 wt % to about 30 wt %, based on the total catalyst weight. In most embodiments, the remainder of the catalyst can be composed of the support material, although optionally other components may be present (e.g., filler, cracking component, molecular sieve, or the like, or a combination thereof).

Suitable support materials for the present catalysts can include, but are not limited to, inorganic refractory materials such as alumina, silica, silicon carbide, amorphous and crystalline silica-aluminas, silica-magnesias, aluminophosphates, boria, titania, zirconia, and the like, as well as mixtures and cogels thereof. Preferred supports can include silica, alumina, alumina-silica, and the crystalline silica-aluminas, particularly those materials classified as clays or zeolitic materials. More preferred support materials for purposes of the present process can include alumina, silica, and alumina-silica, particularly either alumina or silica.

Supported CoMo catalysts of the type described above are available commercially from a number of vendors and/or can be produced by methods well known in the art, for example, such as described in R. G. Leliveld et al., *J. Catal.*, 175 (1998), 108-116, in M. S. Rana et al., *J. Catal.*, 246 (2007), 100-108, and in H. Topsoe and B. S. Clausen, *Appl. Catal.*, 25 (1986), 273-293, the entirety of each disclosure being incorporated herein by reference.

The catalytic metals may be loaded onto the support, e.g., by any conventional techniques, such as impregnation by incipient wetness, by adsorption from excess impregnating medium, by ion exchange, or the like, or combinations thereof. The typical impregnation route is by incipient wetness.

The cobalt and molybdenum components can be deposited onto the support material in either a single step or in two separate steps. For example, in a two-step process, a catalyst precursor can be prepared by impregnating a catalyst support with a first aqueous solution comprising a water soluble salt of cobalt or molybdenum in such concentration as to provide the resulting catalyst precursor with the desired amount of the metal. The impregnated support can then be dried, e.g., by conventional drying techniques (for example at a temperature of about 100° C.) until substantially all the water is driven off (for example, typically for about 2 to about 6 hours). The dried impregnated support can then be oxidized by heating from the drying temperature to about 250° C. to about 450° C. (for example, to about 275° C. to about 400° C.) in the presence of an oxidizing gas, such as air. At least a portion of the resulting partially formed catalyst precursor can then be impregnated a second time with a second aqueous solution containing an effective amount of a water soluble salt of cobalt or molybdenum (the remaining metal not impregnated during the first impregnation) in the appropriate concentration. The partially formed catalyst precursor, now containing both metal components, can then be subjected to second drying and oxidation operations. In an alternate, though less preferable, two-step embodiment, the impregnation steps can be done back to back, with only drying in between first and second aqueous treatments, with a single oxidization step to follow. In another alternate, though less preferable, two-step embodiment, the first and second aqueous solutions can both have water soluble salts of both cobalt and molybdenum, such that the metals are co-impregnated (like a single step embodiment) but in two separate, consecutive stages, with the drying and oxidization steps occurring as stated above.

The resultant catalyst precursor can be converted to the final catalyst by sulfiding, e.g., using conventional sulfiding techniques. This sulfiding may be accomplished in situ, namely in the hydrotreating reactor, by contacting the catalyst with a sulfur-containing feed, e.g., such as $H_2S$, dimethyldisulfide (DMDS), or polysulfides (e.g., as disclosed by C. D. Roberts in the September 2008 issue of Hydrocarbon Processing (p. 133)), or the like, or a combination thereof, in the presence of a flow of about 50 scf/bbl (about 8.5 $Nm^3/m^3$) to about 1500 scf/bbl (about 260 $Nm^3/m^3$) of hydrogen equivalent (in a gas containing less than 100% hydrogen, this should represent the relative or partial hydrogen treat gas rate) under conditions sufficient to effectuate hydrotreating, e.g., which can include a temperature of about 75° C. to about 450° C., a (total) pressure of about 10 psig (about 210 kPag) to about 2500 psig (about 17.3 MPag), and, in liquid-sulfiding processes utilizing DMDS or polysulfides, a liquid hourly space velocity (LHSV) of about 0.3 $hr^{-1}$ to about 2.0 $hr^{-1}$.

The resultant sulfided catalyst can be employed to hydrotreat a wide variety of aromatics- and sulfur-containing hydrocarbon feeds, including distillates and residual oils from atmospheric and vacuum distillation processes, cracked gas oil fractions, and mixtures thereof. In particular, the present process can advantageously be used to hydrotreat hydrocarbon fractions boiling in the diesel fuel range and having an aromatics content of at least 20 wt %, typically from 20 wt % to about 45 wt %, and having a sulfur content of at least about 0.8 wt %, typically from about 1.2 wt % to about 2.6 wt %.

However, before the catalyst is used to hydrotreat a desired (first hydrocarbon) feed, the present process involves treating the fresh catalyst under first hydrotreating conditions with a second hydrocarbon feed having an aromatics content lower than the desired (first hydrocarbon) feed (and/or having an aromatics content below 20 wt %). Conveniently, the first hydrotreating conditions can include a temperature from about 300° C. to about 350° C., a (total) pressure from about 1.5 MPag to about 3.5 MPag, and an LHSV from about 0.3 $hr^{-1}$ to about 1.0 $hr^{-1}$. Moreover, the treating can be conducted for about 3 days to about 10 days, or until the activity of the fresh catalyst has been reduced by at least 5%, for example from 5% to about 15% or from 5% to about 10%. Although the exact composition of the first feed may not be critical, it should generally have an aromatics content below about 15 wt % (e.g., below about 10%, below about 5 wt %, or even below about 2 wt %), which could be produced, for example, by adding aliphatic hydrocarbons (linear, branched, and/or cyclic; perhaps having double bonds, maybe even conjugated double bonds, but not being aromatic) to the desired hydrotreating feed so as to reduce the aromatics content thereof to with the acceptable range (e.g., reduction by at least 50% from its previous level).

After treatment with the second, lower aromatics-content feed, typically in the hydrotreating reactor, the catalyst can be used to hydrotreat the desired hydrotreating feed under second hydrotreating conditions to reduce the sulfur content of the feed, e.g., to less than 15 wppm. In a preferred embodiment, the second hydrotreating conditions can include a temperature of about 300° C. to about 380° C., a (total) pressure of about 1.5 MPag to about 3.5 MPag, and an LHSV of about 0.2 hr$^{-1}$ to about 0.8 hr$^{-1}$. Also in a preferred embodiment, the first and second hydrotreating conditions can be substantially the same.

Another aspect of the invention involves a method for selectively treating hindered sulfur species from a sulfur-containing hydrocarbon feed. Hindered sulfur species are compounds whose sulfur atom(s) is(are) at least partially blocked (sterically hindered) by moieties on other portions of the compound, thus significantly reducing the accessibility of the sulfur atom(s) to a catalytic site at which hydrodesulfurization can occur. Hindered sulfur compounds can be exemplified by 4,6-dialkyl-dibenzothiophenes such as 4,6-dimethyl-dibenzothiophene (DMDBT) and/or 4,6-diethyl-dibenzothiophene (DEDBT), among others. By comparison, unhindered sulfur species are compounds whose sulfur atom(s) is(are) not significantly blocked (sterically hindered) by moieties on other portions of the compound, thus affording relatively unfettered accessibility of the sulfur atom(s) to a catalytic site at which hydrodesulfurization can occur, at least in comparison to the hindered sulfur species. Unhindered sulfur compounds can be exemplified by dibenzothiophene (DBT) and dialkyl disulfides such as dimethyl disulfide (DMDS), among others.

The method can include the use of a multimetallic amine oxide catalyst having the formula $(T1)_x(T2)_{(1-x)}(am)_a(M6)O_b$, where T1 is a first row transition metal from Group VIII of the Periodic Table of Elements, where T2 is a first row transition metal from Group VIIB and/or Group VIII of the Periodic Table of Elements that is different from T1, where M6 is molybdenum and/or tungsten, where "am" is an organic amine ligand such as ethylenediamine, where "x" is a relative molar amount of T1 such that $0<x\leq1$, where "a" is a relative molar amount of the organic amine ligand such that $1\leq a\leq6$, and where "b" is a relative molar amount of the oxygen and $3\leq b\leq5$. Additionally or alternately, the multimetallic amine oxide catalyst can be a cobalt-amine molybdate catalyst having the formula $Co_x(T2)_{(1-x)}(am)_aMoO_b$, where T2 is a first row transition metal from Group VIIB and/or Group VIII of the Periodic Table of Elements other than cobalt, where "am" is an organic amine ligand, where "x" is a relative molar amount of cobalt such that $0.33\leq x\leq1$, where "a" is a relative molar amount of the organic amine ligand such that $1\leq a\leq6$, and where "b" is a relative molar amount of the oxygen and $3\leq b\leq5$. In some preferred embodiments, the cobalt-amine molybdate catalyst has the formula $Co(en)_3MoO_4$.

In order to activate the catalyst for selective hydrodesulfurization methods, the multimetallic amine oxide catalyst can be sulfided in the liquid phase using appropriate sulfiding compositions and sulfiding conditions. In one embodiment, those conditions can include, but are not necessarily limited to: optionally but preferably thermally decomposing (at least partially calcining) the organic-metal oxide complex at a temperature from about 190° C. to about 800° C. (e.g., from about 200° C. to about 500° C.), e.g., in a relatively non-oxidizing atmosphere such as in nitrogen (however, if an at least partially oxidizing atmosphere is used, typically lower temperatures are desired, for example, to control heat release from oxidative decomposition of the organic ligand); exposing the organic-metal oxide complex (optionally but preferably as previously thermally treated and thus as at least partially decomposed/calcined) to a liquid phase sulfiding composition, such as ~3 wt % DMDS in dodecane, optionally but preferably in the presence of a reducing agent such as hydrogen, at temperatures from about 190° C. to about 450° C. (e.g., from about 200° C. to about 425° C.) to sulfide, and thus activate, the catalyst.

As used herein, the term "selective hydrodesulfurization," with reference to a process or catalyst, should be understood to refer to a comparison between hydrodesulfurization effectiveness/activity for hindered sulfur compounds and hydrodesulfurization effectiveness/activity for unhindered sulfur compounds. More particularly, a higher selectivity for hydrodesulfurization of hindered sulfur compounds is sought. A non-selective hydrodesulfurization can generally be characterized as having roughly a similar effectiveness/activity for desulfurizing hindered sulfur compounds as for unhindered. A selective hydrodesulfurization can be characterized herein as having a noticeably higher effectiveness/activity for hindered sulfur compounds than for unhindered. For the purposes of this invention, a "selective hydrodesulfurization" catalyst/process can be characterized as exhibiting at least twice the effectiveness/activity for desulfurizing hindered sulfur compounds as for desulfurizing unhindered sulfur compounds. Such selective hydrodesulfurization capability is believed to be relatively rare, since the accessibility of hindered sulfur atoms is lower than for unhindered sulfur atoms, thus making it difficult for a catalyst/process to be selective the opposite way, i.e., such that higher effectiveness/activity can be attained for hindered versus unhindered sulfur atoms.

The method can further include contacting the activated catalyst with the hydrocarbon feed to be selectively desulfurized in the presence of hydrogen, under conditions sufficient to selectively hydrodesulfurize the hindered sulfur species in the feed, so as to attain a treated hydrocarbon feed having no more than 10 wppm of hindered sulfur species and having 30 wppm or less total sulfur content. In various embodiments, the hydrocarbon feed to be contacted with the activated catalyst can be untreated or pre-treated. Either way, the hydrocarbon feed to be selectively hydrodesulfurized can have at least 25 wppm of hindered sulfur species and/or can have a ratio of hindered sulfur species to unhindered sulfur species of at least 0.4:1.

In the case of pre-treated feeds, an untreated hydrocarbon feed (optionally but typically having a total sulfur content of at least 2000 wppm), prior to being contacted with the activated catalyst, can first be placed in the presence of a hydrotreating catalyst and hydrogen, under similar or different effective hydrotreating conditions (which can optionally but advantageously reduce the total sulfur content to 500 wppm or less, e.g., to 300 wppm or less, to 200 wppm or less, to 100 wppm or less, or to 50 wppm or less) to cause said resultant pre-treated feed to have at least 25 wppm of hindered sulfur species and/or to have a ratio of hindered sulfur species to unhindered sulfur species of at least 0.4:1 upon being contacted with the activated catalyst. In the case of pre-treatment, the effective hydrotreating conditions should generally not be severe enough to render the pre-treated effluent suitable for use in a fuel pool (e.g., a diesel fuel pool) without further treatment.

Further, in embodiments where pre-treatment is conducted, the hydrotreatment catalyst can be any suitable hydrotreatment catalyst, such as one containing at least one of Group VIB and Group VIII metals, either in bulk or on a support such as alumina or silica. Examples can include, but are not limited to, NiMo, CoMo, NiW, and NiMoW catalysts.

Alternately to hydrotreatment as a pre-treatment, a hydrofinishing catalyst and/or hydrofinishing conditions can be used. In some embodiments, hydrofinishing conditions can be similar to (or can fall within the general range of) hydrotreating conditions, e.g., which hydrofinishing conditions can include one or more of a temperature from about 150° C. to about 350° C., for example about 180° C. to about 250° C., a total pressure from about 2.8 MPag (about 400 psig) to about 20.7 MPag (about 3000 psig), an LHSV from about 0.1 hr$^{-1}$ to about 10 hr$^{-1}$, for example about 0.5 hr$^{-1}$ to about 5 hr$^{-1}$, and a hydrogen treat gas rate from about 43 Nm$^3$/m$^3$ (about 250 scf/bbl) to about 1700 Nm$^3$/m$^3$ (about 10000 scf/bbl). Aside from hydrotreating catalysts (which can be used for hydrofinishing), other suitable hydrofinishing catalysts can include, but are not limited to, those containing a Group VIII and/or Group VIB metal, optionally supported, e.g., on a bound support from the M41S family, such as bound MCM-41. Suitable binders for a support from the M41S family, such as MCM-41, can include alumina, silica, and/or any other binder or combination of binders that can provide a high productivity and/or low density catalyst.

For general diesel fuel pool feed material, effective hydrotreating conditions can include one or more of a temperature from about 300° C. to about 425° C., a pressure from about 200 psig (about 1.4 MPag) to about 3000 psig (about 20.7 MPag), an LHSV from about 0.2 hr$^{-1}$ to about 10 hr$^{-1}$, and a hydrogen treat gas rate from about 500 scf/bbl (about 85 Nm$^3$/m$^3$) to about 10000 scf/bbl (about 1700 Nm$^3$/m$^3$). Where it is desired to operate a hydrotreatment process under a milder set of conditions, typically a lower temperature can be selected, such as a temperature from about 260° C. to about 400° C. or from about 260° C. to about 370° C.

The invention will now be more particularly described with reference to the following Examples and the accompanying drawing.

EXAMPLES

The tests reported in Example 1 are conducted in a hydrodesulfurization (HDS) reactor comprising three identical stainless steel cylindrical chambers, each having an internal diameter of about 0.28 inches (about 0.70 cm) and a length of about 7.0 inches (about 18 cm). Fritted gaskets or quartz wool was used to hold the catalyst in place within the reactor chamber. Isolation valves were included to enable off-line catalyst extraction under relatively inert conditions.

All three reactor chambers were placed into a common sand bath, the temperature of which was monitored by three thermocouples positioned to be level approximately with the top, middle, and bottom of the catalyst beds. Any of the three reactors were capable of being operated and capable of being removed from the sand bath independently of the other reactors. H$_2$, N$_2$, or approx. 10 vol % H$_2$S/H$_2$ was fed to the reactors using three independent Brooks Mass Flow Controllers. Three independent HPLC pumps (e.g., Thermo Separation Products ConstaMetric 3200 Solvent Delivery System) fed the sulfidation liquid to the reactors. Three independent ISCO pumps (e.g., Model 500D Syringe Pumps) fed the oil to the reactors during HDS runs.

The gas and liquid feeds were mixed together before arriving at the catalyst bed. The feed was preheated as it traveled down the feed leg before entering the reactor chamber from the bottom. The flow regime in all barrels was up-flow.

Effluent liquids and gases were sent to a slop can where liquids were collected. Gases were vented to a scrubber filled with aqueous KOH solution to neutralize H$_2$S. During sample collection, a knock-out pot separated gases from liquids, again venting gases to the scrubber.

Liquid effluent samples were analyzed using a sulfur/nitrogen analyzer (e.g., ANTEK 9000 Series). Data acquisition software (e.g., from National Instruments) was configured to operate the hardware and an Autosampler (e.g., ANTEK Model 738). The software collected an integrated area or peak height from the analysis of materials of known composition to create an internal calibration curve. The analytical response of sample unknowns was then compared to this calibration curve, and the amount of sulfur and/or nitrogen was determined. Calibration curves were generally approximately linear, and 1$^{st}$ order correlation curve coefficients were obtained in cases where the total S or N concentration range was within an order of magnitude (e.g., 10-100 wppm) of the unknown.

The user was given the ability to define the S/N concentration range ("calibration range") that best approximated the expected range of concentrations in the samples. Typical ranges include 0-10 wppm, 10-100 wppm, 100-1000 wppm, and 1000-10,000 wppm. A calibration file was created for the user-defined range. Detector sensitivity was adjusted, as needed to maximize the peak height of the highest concentration standard in a range to fit within the viewing screen. Detector sensitivity was changed, as needed, by adjusting gain and/or voltage for each photomultiplier tube. The sulfur/nitrogen analyzer was then Since nitrogen concentrations in the samples were frequently in a different range than sulfur concentrations, a calibration file was created that included a combination of calibration ranges for both S and N. A typical calibration file covered the range 10-100 wppm nitrogen and 100-1000 wppm sulfur, although other combinations may be used to reflect other actual conditions.

The user was given the ability to specify the specific gravities of the standards and samples. Typically, 0.69 g/mL was entered for the iso-octane-based standard, and about 0.85-0.88 g/mL was typically entered for diesel samples (depending on their actual density). The auto-sampler was programmed, for example, to make three 8-μL injections for each sample and to calculate the average. The average was reported and used for catalyst activity calculations.

Feedstock properties, along with temperatures, pressures, gas and liquid flow rates, and feed and effluent sulfur levels for each balance were used to calculate HDS activity. An "actual" catalyst activity for desulfurization ($K_{actual}$ or $K_a$) was calculated as a function of actual processing conditions, and was adjusted to base conditions for hydrogen partial pressure, treat gas rate, and temperature. A "predicted" catalyst activity ($K_{predicted}$ or $K_p$) was then calculated based on earlier-collected data with a reference catalyst to account for the feedstock properties at base conditions. A relative catalyst activity (RCA) was calculated from the ratio of $K_{actual}$ to $K_{predicted}$, as follows:

$$RCA = \frac{K_a}{K_p}$$

EXAMPLE 1

About 5 grams of a commercial CoMo catalyst was loaded into each barrel of the HDS reactor. The catalyst bed volume in each barrel was approximately 6 mL. After leak testing, the catalysts were sulfided using a ~2.5 wt % hexadecane solution of DMDS (about 2.0 mL liquid/(mL catalyst h) LHSV) and hydrogen (about 500 standard mL $H_2$/(mL catalyst h) GHSV). The sulfidation lasted about 64 hours and involved an ~8 hour ramp from ambient temperature (about 20-25° C.) to 220° C., holding for about 16 hours at about 220° C., followed by a ~24 hour ramp to about 338° C. (about 640° F.), and holding for about 16 hours at 338° C.

The HDS activity was tested at nominal conditions of about 329° C., about 280 psig (about 1.9 MPag), an LHSV of about 0.54 $hr^{-1}$, a gas hourly space velocity (GHSV) of about 62 $hr^{-1}$, a treat gas ratio of about 645 scf/bbl (about 110 $Nm^3/m^3$). The treat gas was approximately 100% pure hydrogen, although less pure hydrogen with a relatively inert gas (e.g., nitrogen) could have been used to attain a similar result. In the reference run, a refinery diesel oil stream having the properties given in Table 1 was employed.

TABLE 1

| | |
|---|---|
| Feed Sulfur, wt % | ~1.85 |
| Feed Nitrogen, wppm | ~157.0 |
| Feed API Gravity | ~32.6 |
| Feed Specific Gravity | ~0.862 |
| Feed Bromine Number, centigrams/gram | ~1.45 |
| Distillation Type | GCD |
| Distillation, ° F. | |
| IBP | ~335 |
| 10 wt % | ~553 |
| 30 wt % | ~627 |
| 50 wt % | ~661 |
| 70 wt % | ~690 |
| 90 wt % | ~722 |
| 95 wt % | ~736 |
| Saturates, wt % | ~67.8 |
| Aromatics, wt % | ~32.2 |
| mono-aromatics, wt % | ~20.9 |
| di-aromatics, wt % | ~9.8 |

In another experiment, a relatively low aromatics feed (cut with hexadecane) containing about 1.8 wt % total sulfur content with a thiophene/dibenzothiophene molar ratio of about 8:1, was employed in place of the diesel oil of Table 1. The start of run (SOR) deactivation of the supported CoMo catalyst was measured with both feeds at identical conditions during the first 12 days on oil (days on stream). The results are summarized in FIG. 1.

FIG. 1 shows a comparison of start-of-run (SOR) deactivation of the supported CoMo hydrotreating catalyst with the two different feeds at otherwise identical conditions. As shown in FIG. 1, the deactivation after 12 days on stream was reduced from about 33% of the initial activity with the refinery diesel oil stream (containing about 32 wt % aromatics and about 1.8 wt % total sulfur) to about 6% of the initial activity with the hexadecane-based relatively low aromatics feed (containing about 1.8 wt % total sulfur). This demonstrates that the rate of deactivation of the same catalyst was substantially reduced when a relatively low aromatics feed was used at the start of run, in stead of a relatively higher aromatics feed.

Without being bound by theory, it is believed that the relative catalytic activity (RCA) with the relatively low aromatics feed was higher due to the absence of inhibitors, e.g., nitrogen-containing compounds. While nitrogen-containing compounds can inhibit catalytic activity, which can result in lower observed catalytic activity at higher contents of nitrogen-containing compounds (nitrogen contents), they are not believed to significantly affect the rate of deactivation. The effect of nitrogen-containing compounds on the catalytic activity and rate of deactivation of the supported CoMo catalyst was also examined for feeds with about the same aromatics content and total nitrogen concentrations of (a) about 2 wppm, (b) about 12 wppm, and (c) about 157 wppm (nitrogen compounds were selectively extracted to different levels from a diesel feed). While the level of nitrogen-containing compounds can impact the level of catalytic activity at the same conditions, it did not seem to significantly affect the rate of deactivation. In the process of these experiments, seemingly independent of the total nitrogen content of the feeds to the hydrotreating unit, all deactivation curves appeared approximately linear, indicating roughly first order deactivation kinetics, with approximately identical slopes, indicating a significantly similar deactivation rate. The total nitrogen content, however, did seem to affect the observed catalytic activity (RCA) values.

EXAMPLES 2-3

Examples 2-3 focus on metal-amine molybdates (MAM) and metal-amine tungstates (MAT), which have the general formulae: $T1(am)_a(M6)O_b$ and $(T1)_x(T2)_{(1-x)}(am)_a(M6)O_b$, where T1 and T2 are first row transition metals from Group VIIB and/or Group VIII of the (CAS notation) Periodic Table of Elements (that is, Mn, Fe, Co, and/or Ni), where M6 is a transition metal from Group VIB of the (CAS notation) Periodic Table of Elements (for example, Mo or W), where "am" is an organic amine ligand, such as ethylenediamine (abbreviated "en" herein), and where "x," "a," and "b" are the relative molar amounts of the T1 metal, the organic amine ligand, and the oxygen, respectively. An exemplary, but not limiting, preparation of the molybdate form involves reacting a cobalt chloride hydrate with ammonium paramolybdate in excess en. In this exemplary embodiment, the products can tend to be insoluble in en-$H_2O$ solutions containing ~50% or more by volume of amine, and thus can be recovered by filtration, for example, followed by washing with dry acetone. The intimacy between Co and the Mo-oxide moieties can generate an environment conducive to the Co promotion effect along the $MoS_2$ edge planes, when the MAM/MAT is sulfided. Since thermal decomposition of MAMs/MATs can generally be a prerequisite for sulfidation, conventional catalyst activation protocol typically involves two steps: heat treatment with nitrogen followed by gas sulfiding with a sulfur-bearing gas mixture (for example, ~10 vol % $H_2S$ in $H_2$). See, for example, U.S. Pat. No. 4,663,023.

To test the effect of sulfiding phase/protocol, comparative experiments were carried out over a bulk CoMo sulfide derived from the precursor $Co(en)_3MoO_4$. A co-current fixed-bed reactor, made of a nominal ⅜" ID 316 stainless steel pipe, was operated isothermally in up-flow mode. With dodecane as the carrier solvent, two model-compound feed mixtures were used. One contained about 1.5 wt % dibenzothiophene (DBT), while the other contained about 0.8 wt % 4,6-diethyl-dibenzothiophene (DEDBT). The reaction conditions were about 265° C., about 250 psig (about 1.7 MPag) $H_2$ pressure, about 6 $cm^3$/min (room temperature; ~20-25° C.) $H_2$ flow rate, and about 0.05 $cm^3$/min liquid feed flow rate. The catalyst particles were compressed to wafers, then crushed and sized to ~60-80 mesh granules to ensure an adequate particle-to-reactor diameter ratio. The liquid products were identified and quantified by GC/MS and GC using a ~75% OV1/25% SW-10 fused silica capillary column. Decane was used as the internal standard.

EXAMPLE 2

Gas Phase Sulfiding

The precursor Co(en)$_3$MoO$_4$ (about 1.29 g) was sulfided with the 10% H$_2$S in H$_2$ gas mixture at about 400° C. for about 2 hours. The HDS activity test was conducted at a WHSV of about 8.1 hr$^{-1}$. This catalyst demonstrated a ~74% HDS level in the test with DBT and a ~70% HDS level in the test with DEDBT. The gravimetric HDS activities for the DBT test and the DEDBT test, assuming pseudo-first-order rate constant, were about 10.9 cm$^3$ liquid feed per gram catalyst per hour and about 9.8 cm$^3$ liquid feed per gram catalyst per hour, respectively.

EXAMPLE 3

Liquid Phase Sulfiding

The precursor Co(en)$_3$MoO$_4$ (about 0.75 g) was thermally decomposed under ~200 cm$^3$/min flowing nitrogen at about 370° C. for approximately three hours. Subsequently, the temperature was lowered to room temperature (~20-25° C.) in flowing N$_2$. The thus-decomposed oxide particles were passivated with ~1% O$_2$ in He at room temperature overnight. This was followed by sulfiding with ~3 wt % dimethyl disulfide (DMDS) in dodecane at about 260 psig (about 1.8 MPag) according to the following sequence of steps:
1) the catalyst bed was heated to about 66° C. and maintained at ~66° C. for about six hours with a liquid flow rate of ~0.13 cm$^3$/min;
2) H$_2$ was introduced at a rate of about 30 cm$^3$/min while maintaining the same liquid flow rate at about 232° C. for about 18 hours;
3) the reactor temperature was raised to about 332° C. and held for about 12 more hours; and
4) the reactor was switched to the reaction feed at the desired rate, temperature, and pressure.

The HDS activity test was conducted at a WHSV of about 8.1 hr$^{-1}$. This catalyst demonstrated a ~24% HDS in the test with DBT and a notably high ~97% HDS in the test with DEDBT. The gravimetric HDS activities for the DBT test and the DEDBT test, assuming pseudo-first-order rate constant, were about 2.2 cm$^3$ liquid feed per gram catalyst per hour and about 28.4 cm$^3$ liquid feed per gram catalyst per hour, respectively.

The results of Examples 2-3 show that sulfiding protocol has a dramatic effect on the performance of bulk metal sulfide catalysts. Specifically, liquid sulfiding can significantly enhance the hydrogenation function of bulk catalysts and hence boost the HDS rate of hindered (refractory) sulfur species. On the other hand, gas sulfiding can enhance the HDS rate of unhindered sulfur species. An optimum sulfiding protocol may be designed based on the concentrations of different sulfur types in the feedstock. For instance, due to competitive adsorption, unhindered sulfur compounds can tend to get desulfurized (e.g., simple HDS) in the upstream zone of a hydrotreater, while hindered sulfur compounds can be desulfurized (e.g., deep HDS) in the downstream zone. It can thus be desirable, in certain embodiments, to use gas-phase sulfided and liquid-phase sulfided catalysts in the upstream and downstream zones of the reactor, respectively. In some embodiments, the gas-phase sulfided catalyst can be pre-sulfided ex situ prior to being charged to the reactor. Without being bound by theory, it is believed that the activity of the pre-sulfided catalyst would be only minimally affected by subsequent exposure to the sulfiding liquid, since gas-phase sulfiding is done at temperatures relatively higher than those used in liquid-phase sulfiding. For HDS reaction on naphtha boiling range feeds, gas-phase sulfiding may improve selectivity via suppression of olefin saturation.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for selectively treating hindered sulfur species from a sulfur-containing hydrocarbon feed, the method comprising:
   providing a multimetallic amine oxide catalyst having the formula $(T1)_x(T2)_{(1-x)}(am)_a(M6)O_b$, where T1 is a first row transition metal from Group VIII of the Periodic Table of Elements, where T2 is a first row transition metal from Group VIIB and/or Group VIII of the Periodic Table of Elements that is different from T1, where M6 is molybdenum and/or tungsten, where "am" is an organic amine ligand, where "x" is a relative molar amount of T1 such that $0<x\leq1$, where "a" is a relative molar amount of the organic amine ligand such that $1\leq a\leq6$, and where "b" is a relative molar amount of the oxygen and $3\leq b\leq5$;
   sulfiding the multimetallic amine oxide catalyst using a sulfiding composition and sulfiding conditions in the liquid phase in order to activate the catalyst for selective hydrodesulfurization;
   hydrotreating a sulfur-containing hydrocarbon feed having at least 25 wppm of hindered sulfur species, in the presence of hydrogen, under first effective hydrotreating conditions sufficient to selectively hydrodesulfurize the hindered sulfur species in the feed, so as to attain a treated hydrocarbon feed having no more than 10 wppm of hindered sulfur species and having 30 wppm or less total sulfur content.

2. The method of claim 1, wherein T1 is cobalt, and "x" is a relative molar amount of cobalt such that $0.33\leq x\leq1$.

3. The method of claim 1, wherein the organic amine ligand comprises ethylenediamine.

4. The method of claim 2, wherein the organic amine ligand comprises ethylenediamine.

5. The method of claim 4, wherein the cobalt-amine molybdate catalyst has the formula Co(en)$_3$MoO$_4$.

6. The method of claim 1, wherein the hydrocarbon feed has a ratio of hindered sulfur species to unhindered sulfur species of at least 0.4:1.

7. The method of claim 6, wherein the hydrocarbon feed has a total sulfur content of at least 2000 wppm.

8. The method of claim 7, wherein the hydrocarbon feed, prior to being contacted with the activated catalyst, is first placed in the presence of a hydrotreating catalyst and hydrogen, under effective hydrotreating conditions to reduce the total sulfur content to 500 wppm or less with at least 25 wppm of hindered sulfur species.

9. The method of claim 1, wherein the sulfiding conditions in the liquid phase comprise contacting the multimetallic amine oxide catalyst with the sulfiding composition in the presence of hydrogen at temperatures from about 190° C. to about 450° C. (374° F. to 842° F.).

10. The method of claim 2, wherein the sulfiding conditions in the liquid phase comprise contacting the multimetallic amine oxide catalyst with the sulfiding composition in the presence of hydrogen at temperatures from about 190° C. to about 450° C. (374° F. to 842° F.).

11. The method of claim 9, wherein the sulfiding composition is comprised of dimethyl-disulfide (DMDS).

12. The method of claim 10, wherein the sulfiding composition is comprised of dimethyl-disulfide (DMDS).

13. The method of claim 11, wherein the sulfiding composition is further comprised of dodecane.

14. The method of claim 12, wherein the sulfiding composition is further comprised of dodecane.

15. The method of claim 9, wherein the hydrocarbon feed is comprised of 4,6-dimethyl-dibenzothiophene (DMDBT) and 4,6-diethyl-dibenzothiophene (DEDBT).

16. The method of claim 10, wherein the hydrocarbon feed is comprised of 4,6-dimethyl-dibenzothiophene (DMDBT) and 4,6-diethyl-dibenzothiophene (DEDBT).

* * * * *